COMPOSITE SELF-SEALING CAP
Filed May 20, 1966 2 Sheets-Sheet 1
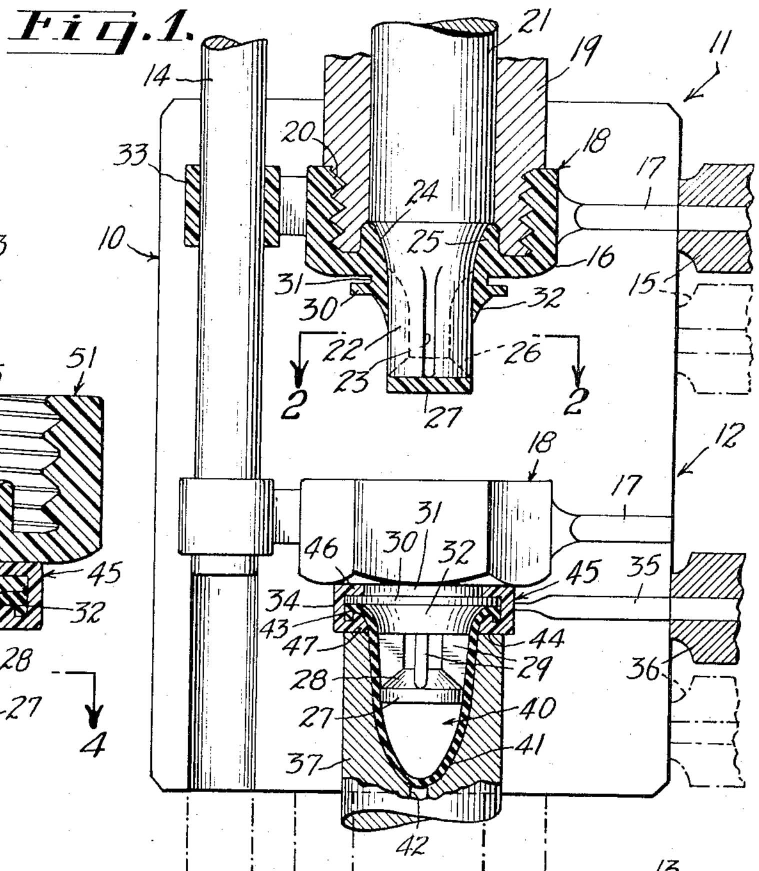
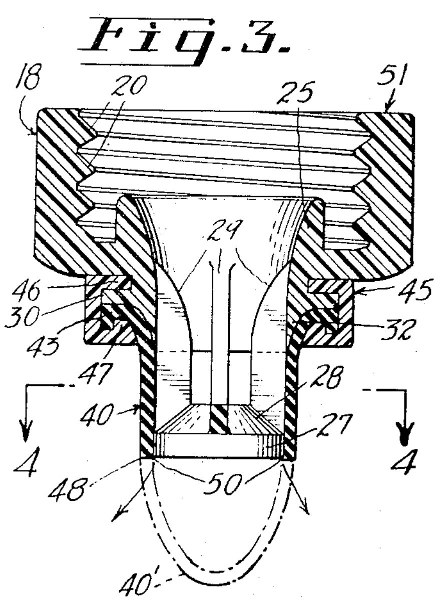
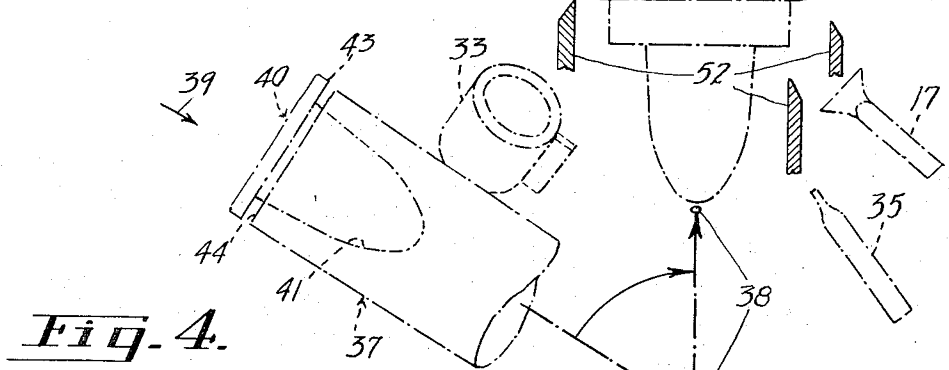
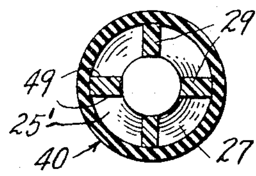
INVENTOR.
LOUIS H. MORIN
BY
Howard E. Thompson
ATTORNEY COMPOSITE SELF-SEALING CAP
Filed May 20, 1966
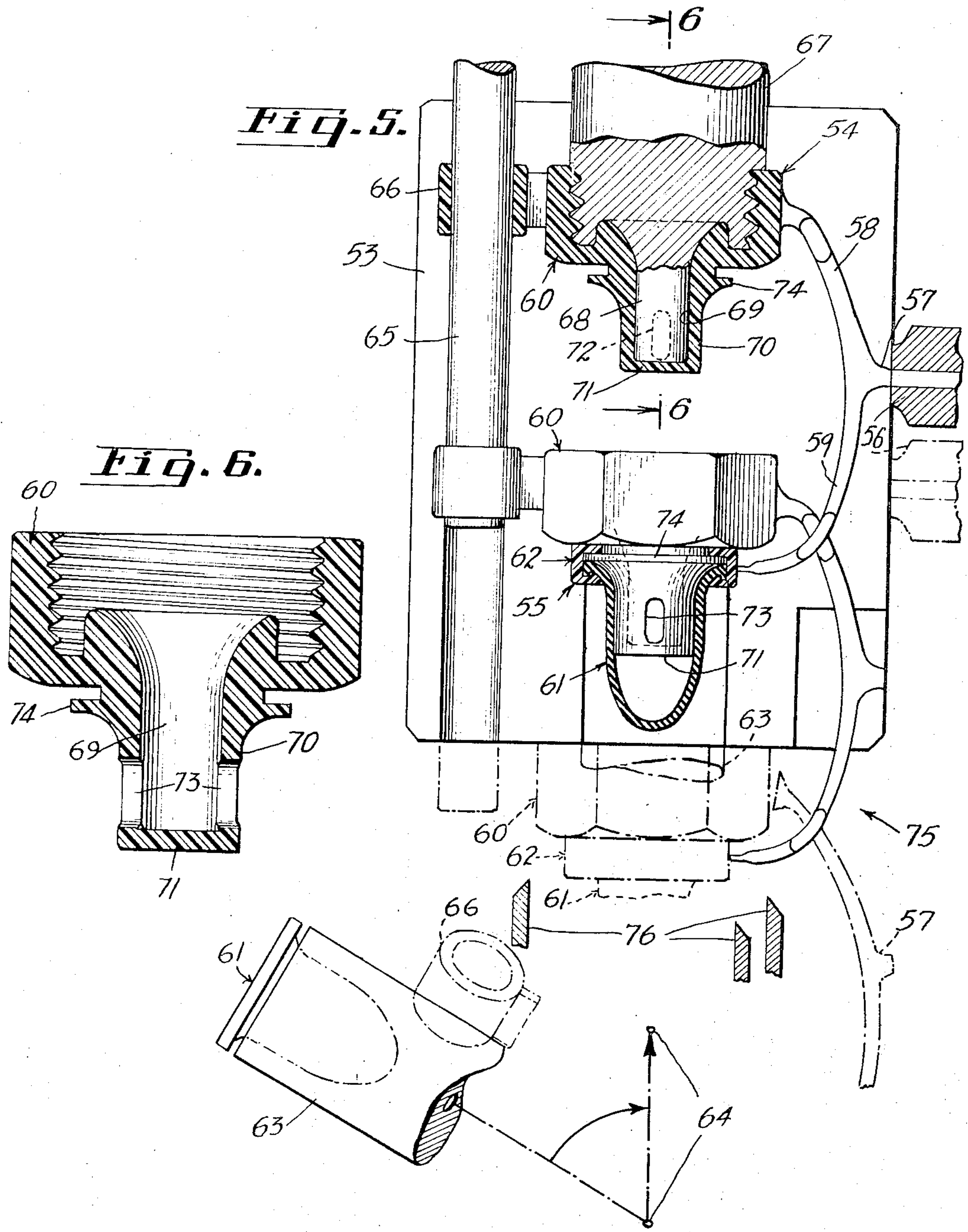
INVENTOR.
LOUIS H. MORIN
BY
Howard E. Thompson
ATTORNEY

United States Patent Office 3,348,744
Patented Oct. 24, 1967

3,348,744

COMPOSITE SELF-SEALING CAP

Louis H. Morin, Bronx, N.Y., assignor to Coats & Clark Inc., New York, N.Y., a corporation of Delaware Filed May 20, 1966, Ser. No. 551,711
3 Claims. (Cl. 222—494)

ABSTRACT OF THE DISCLOSURE

A self-sealing cap for collapsible tubes and other containers wherein a controlled inside pressure is used to expel the contents. Said cap device is sealed against any reasonable internal pressure until ready to be put into use when it is prepared to deliver the contents upon exercise of internal pressure and to seal itself upon release of said pressure.

This invention deals with the formation of two molded parts one upon another in one or two different types or colors of plastic material and, further, wherein an assemblage can be made of said parts, with a third part positioned at a second cavity portion of a pair of dies. More particularly, the invention deals with the production of what I term a composite self-sealing cap for use as a closure upon collapsible metallic or other tubes or containers and, wherein, the third or insert part is formed from rubber or similar flexible plastic and operates in connection with the head of one of the molded parts in controlling discharge of material from the tube or container, in connection with which the cap is employed.

Still more particularly, the invention deals with the method of producing composite self-sealing caps and the like.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic face view of one die of a pair of dies used in conjunction with a dual injection casting machine for injecting plastic material into die cavities from two different nozzles, parts of the construction being shown in elevation, parts being shown in section and in different positions in dot-dash lines and showing the formed assemblage in dot-dash lines at a trimming and stripper station.

FIG. 2 is an enlarged section on the line 2—2 of FIG. 1 showing only the core structure.

FIG. 3 is an enlarged sectional detail view of the finished cap assemblage as formed at the second casting station of the die shown in FIG. 1 and indicating, in dot-dash lines, the removal of a portion of the insert part in producing the resulting cap or end product.

FIG. 4 is a section on the line 4—4 of FIG. 3.

FIG. 5 is a view, similar to FIG. 1, showing another method utilizing a single injection nozzle for delivering plastic material to two cavities of the dies and indicating the insert support in inoperative position in full lines and illustrating in part, in dotted lines, the operative position; and FIG. 6 is an enlarged sectional view of the first molded part of the resulting end project, the section being taken on the line 6—6 of FIG. 5.

In illustrating one adaptation of my invention, I have shown in FIGS. 1 to 4, inclusive, one method of procedure and, in said figures, 10 represents a face view of one die of a pair of dies which are employed. At 11 and 12 I have shown the two molding stations of the dies and, at 13, I have shown the trimming and stripper station. At

14 is shown a transfer pin arranged between the dies for movement of the cast parts, as later described. At 15 is shown one nozzle employed for injecting one type or color of plastic material into the cavity 16 through a gate or sprue 17 in forming a nut-like or cap part 18 in the cavity 16.

At 19 I have shown a rotatable thread forming core, which extends into the cavity 16 to form threads 20 in the bore of the part 18. At 21 I have shown an axially movable core arranged within the core 19, the core 21 having a reduced cylindrical lower end 22, having grooves 23 formed therein, as clearly noted in FIG. 2 of the drawing, these grooves serving to form molded ribs, as later described. The end 22 joins the core 21 proper in a flared upper end, as seen at 24, and this flare, in conjunction with part of the core 19, forms a raised sleeve 25.

The lower end of 22 is recessed, as indicated in dotted lines at 26 in FIG. 1, and this recess, in combination with the dies, forms a closure head 27 on the resulting molded product, including the upper bevelled surface 28 of the head, as clearly noted in FIG. 3 of the drawing. The grooves 25' form, in the resulting molded part 18, four ribs 29 extending downwardly from 25 to the upper bevelled surface 28.

The dies are so formed as to provide on the molded part 18 a projecting key rim 30 spaced from the threaded body, thus forming, in this space, a neck portion 31. The dies further form a rounded collar 32 on the outer or lower surface of the key rim 30, as clearly noted in FIG. 1. In molding the part 18, part of the plastic material extends in a ring 33 arranged upon a transfer pin 14.

At the molding station 12 is shown a second cavity 34 with a gate or sprue 35 leading to said cavity, through which plastic material from a second injection nozzle 36 is adapted to pass, this nozzle preferably directing a plastic material of a different type or color from that injected from the nozzle 15. It will be understood that the dies are fashioned to receive the molded part 18 and its associated members. Prior to delivery of the part 18 to the second cavity station 34, a product delivery core and die member 37 is moved into position in registration with the cavity 34, as shown, in part, in full lines in FIG. 1. The member 37 swings on a pivot 38, which is movable axially to the two poistions noted diagrammaticaly in FIG. 1 so that, in the full line position, the member 37 will be in the upper pivot position; whereas, in the lower pivot position, the same 37 will assume the dot-dash position of FIG. 1, with the end thereof adjacent an insert delivery station, indicated by the arrow 39 where an insert, such as the nipple 40 shown, can be delivered into a supporting socket 41 of the member 37 from a Syntron hopper.

Considering the full line showing of 37 in FIG. 1, it will be noted that the member 37 has a bore 42, in which can be created a vacuum from a suitable source for definitely retaining the insert nipple 40 in position in the member 37, in which position an undercut rim 43 on the insert or part 40 is spaced above the upper surface 44 of the member 37, as clearly indicated in the dot-dash showing and also clear from the full line illustration.

The cavity 34, in combination with the member 37, the insert 40, as well as the portions comprising the key rim 30 and collar 31 and body of the nut of the part 18 will result in forming a double flange coupling and sealing member or part 45, one flange 46 of said part engaging the rim 30, as well as the neck 31 and the other flange 47 is shaped to conform with the contour of the undercut rim 43 of the nipple insert 40, as clearly illustrated in FIG. 3 of the drawing.

From the foregoing, it will be apparent that, in the molding station 12, the parts 18 and 45 are formed one upon the other in an intercoupled assemblage and, in the particular illustration given where an insert such as the nipple part 40 is employed, an assemblage is provided between the three basic parts 18, 40 and 45, as will be apparent.

After the assemblage has been made at the molding station 12, the member 37 is moved downwardly and then swung to the dot-dash position at station 39, after which, the pin 14 is moved to the dot-dash position of FIG. 1, which moves the assemblage to the dot-dash position noted in FIG. 1 at the trimming and stripper station 13. In this operation, it will be apparent that the cast product 18 is then moved into registration with the cavity 34 and, after the trimming operation has been performed, the three part assemblage is stripped from the pin 14 when the dies are in at least a partially closed position and the pin is returned to the full line position, which leaves the part 18 in the cavity 43. Then the above cycle of operation is repeated in simultaneously forming another part 18, while the part 45 is formed about the part 18 then positioned in the cavity 34.

Considering the showing in FIG. 3 of the drawing, it will be apparent that, in production of the resulting composite self-sealing cap, the nipple part 40 is trimmed at 48 in line with the exposed surface of the closure head 27, as diagrammatically shown in FIG. 3, to remove the portion 40', shown in dot-dash lines in said figure. In the molding operation, it will clearly appear from a consideration of FIG. 4 of the drawing that spaces 49 are formed between the ribs 29, into which material from the flexible metal or other tube with which the cap is coupled is compressed in forcing material out through the nipple 40 at the periphery of the head 27, as indicated at 50 in FIG. 3 and by the arrows shown. At this time, it is pointed out that the nipple 40 can be formed of rubber or a flexible plastic, such as polypropylene, having the characteristics of sealing upon the periphery of the head 27 in maintaining a closure when the tube or container is not in dispensing use.

The assemblage, as shown in full lines in FIG. 3, can be defined as the three part end product 51 formed in accordance with my method.

At the station 13, I have diagrammatically illustrated trimming knives 52 for trimming the molded assemblage, as shown in the lower part of FIG. 1 when it is positioned at the station 13, as illustrated in dot-dash lines.

Turning now to the showing in FIGS. 5 and 6, in FIG. 5 I have shown at 53 a face view of a modified form of die having cavities, as at 54 and 55, defining two stations, similar to the stations 11 and 12 of FIG. 1. At 56 is shown one nozzle for injecting plastic material into a gate 57 and its branches 58 and 59 for injecting the same plastic material into the two cavities 54 and 55.

At 60 is shown a molded part, generally similar to the part 18, but modified to the extent, later described. At 61 is shown an insert nipple part, similar to the part 40, and at 62 is shown a part, similar to the part 45 of FIG. 1. At 63 is shown a member, similar to the member 37, which swings on the pivot 64 movable into the two positions, the same as the pivots 38. At 65 I have shown a transfer pin, similar to the pin 14, on which part of the molded product extends, as seen at 66, similar to the ring 33 of FIG. 1.

With the structure shown in FIG. 5, one rotatable core 67 is employed for forming the threads of the part 60, as well as a sleeve, similar to the sleeve 24. The core 67 includes an integral extension 68 forming a chamber or bore 69 in a cylindrical extension 70 on the part 60. The extension 68, in combination with the dies, also forms a closed head end 71, substantially similar to the head 27, except for its cross-sectional contour. The two dies employed will have cores and the core of the die 53 is indicated in dotted lines at 72 in FIG. 5. These cores will form oppositely disposed discharge apertures 73, which open into the chamber or bore 69 of the molded part 60, as clearly illustrated in FIG. 6 of the drawing. The molded part 60 also includes a key rim 74, similar to the rim 30. At 75 is illustrated in FIG. 5 the trimming and stripper station, which station will include trimming knives 76, similar to the knives 52.

The method of procedure in forming the three part assemblage, as noted in the lower cavity 55 of the die 53, will be the same as with the structure shown in FIGS. 1 to 4, inclusive. The resulting end product will have the lower portion of the nipple part 61 removed, as diagrammatically seen in FIG. 3 and, with this structure, the discharge of material through the cap will be therough the bore 69, the apertures 73 and out through the lower portion of the part 61 around the periphery of the head 71, in the manner diagrammatically illustrated in FIG. 3 of the drawing.

The method and structure, as illustrated in FIGS. 5 and 6, will produce an assemblage of parts 60 and 62 which are composed of the same material as to characteristics and color. However, the type of end product, as shown in FIGS. 5 and 6, can be produced in accordance with a method as disclosed in FIG. 1 of the drawing by the use of two injection nozzles and separate sprues leading to the respective cavities 54 and 55.

Having fully described my invention, what I claim as new and desire to secure by Letters Patent is:

1. A molded product of the character defined, comprising a molded plastic nut part including an annular key rim portion adjacent one surface thereof, a projecting end extending outwardly from said nut part through and beyond said key rim portion, a closure head on said projecting end, a flexible nipple part enclosing said projecting end and adapted to sealingly engage said closure head with a free end of said nipple part extending outwardly beyond said closure head, a plastic coupling member having dual flanges molded onto said key rim portion of the first part in coupling said parts together, and said dual flanges housing said key rim portion in retaining said parts against separation.

2. A molded product as defined in claim 1, wherein the plastic material of the nut part is different from the plastic material of the coupling part.

3. A molded product as defined in claim 1, wherein said insert part includes an undercut rim engaged by said coupling part in effecting a seal of the insert on said nut part.

References Cited

UNITED STATES PATENTS

| | | | |
|---|---|---|---|
| 1,633,922 | 6/1927 | Carter | 264—263 X |
| 2,098,799 | 11/1937 | Wilson | 222—490 |
| 2,510,091 | 6/1950 | Dofsen et al. | 264—255 X |
| 2,554,008 | 5/1951 | Burger | 264—262 X |
| 2,714,949 | 8/1955 | Morin | 264—255 X |
| 2,763,032 | 9/1956 | Fay | 264—263 |
| 3,093,434 | 6/1963 | Francis | 334—195 |
| 3,113,284 | 12/1963 | Van Inthoudt | 264—284 X |
| 3,115,682 | 12/1963 | Soubier et al. | 264—255 X |
| 3,141,054 | 7/1964 | Francis | 264—255 |
| 3,178,497 | 4/1965 | Moscicki | 264—255 X |
| 3,214,102 | 10/1965 | Meyer | 222—490 X |
| 3,231,149 | 1/1966 | Yuza | 222—494 X |
| 3,249,268 | 5/1966 | Neuner | 222—494 |

FOREIGN PATENTS

| | | |
|---|---|---|
| 118,930 | 9/1944 | Australia. |
| 511,989 | 8/1939 | Great Britain. |
| 304,548 | 3/1955 | Switzerland. |

RAPHAEL M. LUPO, *Primary Examiner.*